(12) United States Patent
Womack et al.

(10) Patent No.: US 8,359,509 B2
(45) Date of Patent: Jan. 22, 2013

(54) SYSTEM AND METHOD FOR DETERMINATION OF RESERVED HYBRID AUTOMATIC REPEAT REQUEST IDENTIFIERS

(75) Inventors: James Earl Womack, Bedford, TX (US); Zhijun Cai, Euless, TX (US); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 400 days.

(21) Appl. No.: 12/543,439

(22) Filed: Aug. 18, 2009

(65) Prior Publication Data

US 2010/0325503 A1 Dec. 23, 2010

Related U.S. Application Data

(60) Provisional application No. 61/089,624, filed on Aug. 18, 2008.

(51) Int. Cl.
*G06F 11/00* (2006.01)
(52) U.S. Cl. .................................................. 714/749
(58) Field of Classification Search .................. 714/748, 714/749
See application file for complete search history.

(56) References Cited

U.S. PATENT DOCUMENTS

| 2008/0049692 A1* | 2/2008 | Bachu et al. ................... 370/338 |
| 2009/0103500 A1* | 4/2009 | Malkamaki et al. .......... 370/336 |
| 2009/0109937 A1* | 4/2009 | Cave et al. ..................... 370/336 |
| 2010/0085927 A1* | 4/2010 | Torsner et al. ................. 370/329 |
| 2010/0325503 A1* | 12/2010 | Womack et al. ............... 714/748 |

OTHER PUBLICATIONS

3GPP TS 36.300 V8.9.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Jun. 2009; 159 pages.
3GPP TS 36.331 V8.6.0; 3rd Generation Partnership Project; Technical Specification Group Radio Access Network; Evolved Universal Terrestrial Radio Access (E-UTRA) Radio Resource Control (RRC); Protocol Specification; Release 8; Jun. 2009; 207 pages.
3GPP TS 36.321 V8.6.0; 3rd Generation Partnership Project; Technical Specification Group Radio Access Network; Evolved Universal Terrestrial Radio Access (E-UTRA) Medium Access Control (MAC) Protocol Specification; Release 8; Jun. 2009; 47 pages.

* cited by examiner

*Primary Examiner* — Scott Baderman
*Assistant Examiner* — Yair Leibovich
(74) *Attorney, Agent, or Firm* — Conley Rose, P.C.; J. Robert Brown, Jr.

(57) ABSTRACT

A system and method are provided for determining a minimum number of reserved hybrid automatic repeat request (HARQ) process identifiers (IDs). The method includes, determining a minimum number of reserved HARQ Process IDs based upon a maximum transmission time and a period of a semi-persistent resource allocation.

10 Claims, 11 Drawing Sheets

200

261 — Determining a HARQ process ID based upon at least one of the system frame number, the subframe number, a period associated with a transmission and/or a reserved number of HARQ process IDs.

262 — Associating the determined HARQ process ID with a transmission.

Figure 2

SYSTEM AND METHOD FOR DETERMINATION OF RESERVED HYBRID AUTOMATIC REPEAT REQUEST IDENTIFIERS

BACKGROUND

As used herein, the terms "user agent" and "UA" can refer to wireless devices such as mobile telephones, personal digital assistants, handheld or laptop computers, and similar devices that have telecommunications capabilities. In some embodiments, a UA may refer to a mobile, wireless device. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as desktop computers, set-top boxes, or network nodes. When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE ENB, that can provide a UA with access to other components in a telecommunications system.

For a wireless Voice over Internet Protocol (VoIP) call, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a diagram of a method for associating initial transmissions and retransmissions according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a system is provided. The system includes a component configured to determine a minimum number of reserved HARQ Process IDs based upon a maximum transmission time and a period of a semi-persistent resource allocation.

In another embodiment, a method is provided for determining a minimum number of reserved HARQ Process IDs comprising calculating a maximum number of reserved HARQ Process IDs based upon a maximum transmission time and a period of a semi-persistent resource allocation.

The procedure of determining resource capacity one time and then periodically allocating substantially the same resource capacity can be referred to as semi-persistent scheduling (also referred to as configured scheduling). In semi-persistent scheduling, there is no PDCCH (Physical Downlink Control Channel) indication of recurring resource availability for a UA; hence the signaling overhead in both the uplink and the downlink is reduced. That is, in semi-persistent scheduling, the resource capacity provided to multiple data packets on a resource is allocated based on a single scheduling request or PDCCH grant.

Hybrid Automatic Repeat Request (HARQ) is an error control method sometimes used in digital telecommunications, including data transmissions that use semi-persistent scheduling. HARQ is a sequence of events that start with the transmission of data to a recipient. The data is often encoded and contains error correction and detection bits in ways known to those skilled in the art. The recipient that receives the data attempts to decode the data and responds with an acknowledgement (ACK) or non-acknowledgement (NACK) message or indication. An ACK is sent if the data is received and decoded successfully. If a NACK is sent, another transmission of the same data or data with additional error detection and correction bits associated with the initial transmission is sent. If the recipient of the retransmission is able to successfully decode the additional bits, then the recipient accepts the data block associated with the additional bits. If the recipient is not able to decode the additional bits, the recipient might request a retransmission (e.g. NACK).

Figure 1:
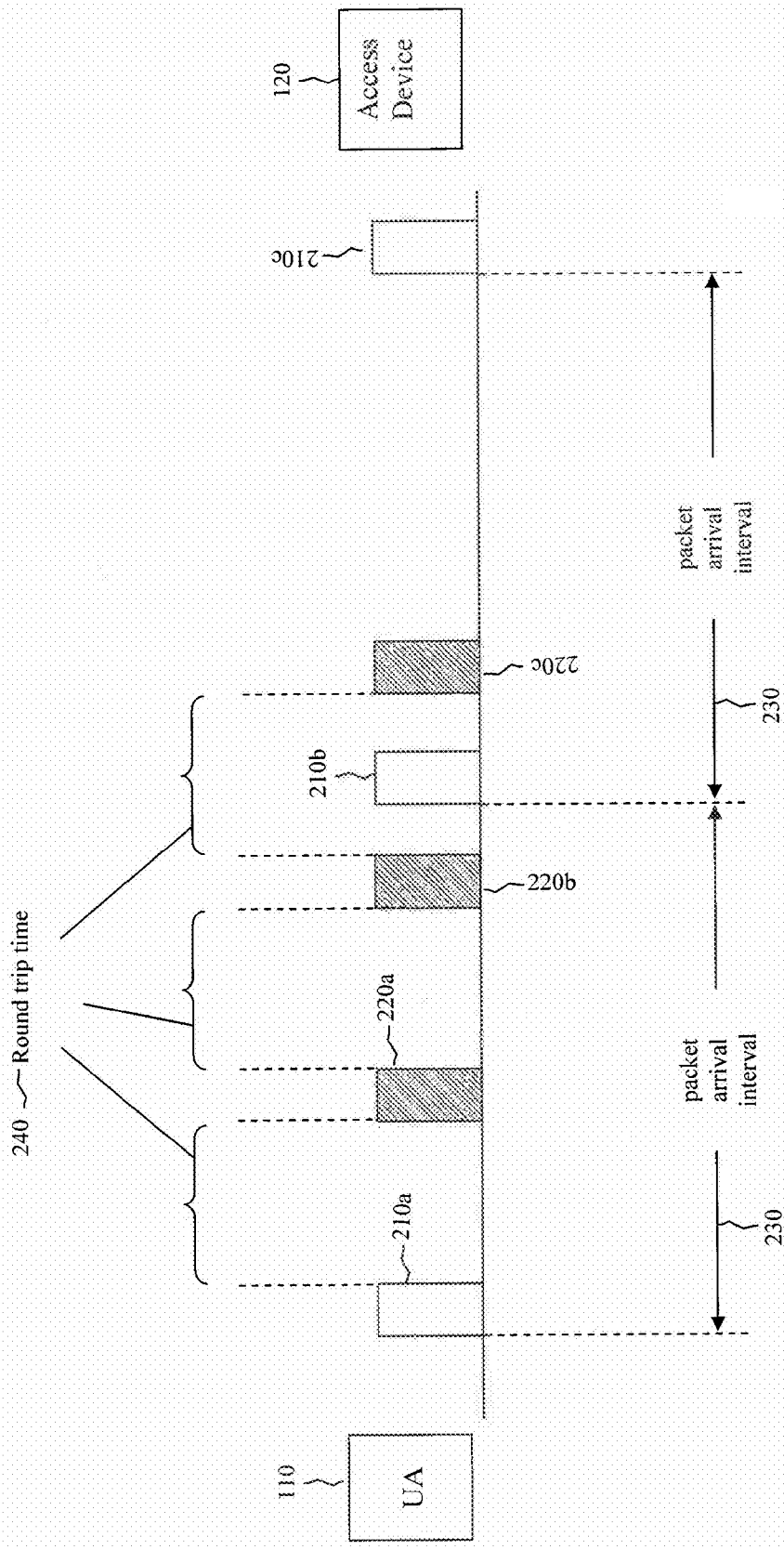
FIG. 1 is an illustration of data transmissions and retransmissions according to an embodiment of the disclosure.

FIG. 1 illustrates a series of data transmissions from an access device 120 to a UA 110. The data transmissions include initial transmissions 210 and retransmissions 220 that occur when the UA 110 does not successfully receive the initial transmissions 210. The initial transmissions 210 include the HARQ error detection bits and occur at periodic packet arrival intervals 230, e.g., 20 milliseconds. Upon receiving an initial transmission 210, the UA 110 attempts to decode the data found in the assigned resource. If the decoding is successful, the UA 110 accepts the data packet associated with the initial data transmission 210 and sends an acknowledgement (ACK) message to the access device 120. If the decoding is unsuccessful, the UA 110 places the data packet associated with the initial data transmission 210 in a buffer associated with an HARQ process ID and sends a non-acknowledgement (NACK) message to the access device 120.

If the access device 120 receives a NACK message, the access device 120 sends a retransmission 220 of the initial transmission 210. The retransmissions 220, like the initial transmissions 210, may include HARQ error detection bits. If the decoding of a retransmission 220 together with its corresponding initial transmission 210 is unsuccessful, the UA 110 might send another NACK message, and the access device might send another retransmission 220. The UA 110 typically combines an initial transmission 210 and its corresponding retransmissions 220 before the decoding. The interval between an initial transmission 210 and its first retransmission 220 or between two retransmissions 220 is typically on the order of several milliseconds and can be referred to as the round trip time 240.

The process of the access device 120 sending the UA 110 an initial transmission 210, waiting for an ACK or NACK message from the UA 110, and sending a retransmission 220 when a NACK message is received can be referred to as a HARQ process. The access device 120 can support only a limited number of HARQ processes, e.g., eight. Each HARQ process is given a unique ID, and a particular HARQ process might be reserved for the exclusive use of one series of data transmissions. For example, if HARQ process 1 is reserved for a semi-persistent resource, no other transmissions can use HARQ process 1.

A HARQ process ID might be designated via the PDCCH. As noted above, for semi-persistent (or configured) scheduling only the very first initial transmission of a talk spurt is assigned in the PDCCH. Subsequent initial transmissions 210 associated with the semi-persistent (or configured) resource are not assigned via the PDCCH and therefore have no associated HARQ process ID. Only the retransmissions 220 which are assigned via the PDCCH are assigned a HARQ process ID. Hence there is no direct linkage between the initial transmission 210 and a possible retransmission 220. That is, when the UA 110 receives a retransmission 220, the UA 110 may have to assume that the retransmission 220 is for the most recent initial transmission 210 that requires a retransmission; however, the retransmission may actually be associated with a prior initial transmission 210. If the UA 110 has to assume, it may make the wrong assumption.

This can be illustrated in FIG. 1, where it can be assumed that the UA 110 does not successfully receive an initial transmission 210a. It is assumed that the initial transmission 210a is not the very first transmission (i.e. not signaled with PDCCH) sent using the semi-persistent (or configured resource) but is instead an initial transmission that does not have an associated HARQ process ID. The UA 110 then sends a NACK to the access device 120. Upon receiving the NACK, the access device 120 sends the UA 110 a first retransmission 220a. Since the retransmission is sent via the PDCCH it has an HARQ process ID assigned. The UA 110 will provide this data to the HARQ process associated with the ID. That process may or may not have the data from the original transmission. The UA 110 does not successfully decode the data after receiving the first retransmission 220a and sends another NACK. The access device 120 then sends a second retransmission 220b, which the UA 110 again does not successfully decode. The UA 110 sends a third NACK, and the access device 120 sends a third retransmission 220c.

A simple way to resolve this issue is to reserve an HARQ process ID for all of the initial transmissions 210 and retransmissions 220 for the duration of a session between the access device 120 and the UA 110. In this way, the UA 110 would know that retransmissions 220a and 220b, for example, are associated with the initial transmission 210a.

A problem may still arise with retransmissions that take place after a second initial transmission 210b. There is a conflict between the first and second initial transmissions. They both have the same HARQ process ID. It is also now unknown which initial transmission will be combined with the retransmission that occurs after the second initial transmission. This issue might be resolved by reserving two HARQ processes and assigning them to alternating initial transmissions 210. If the UA 110 and the access device 120 are both aware that the two HARQ processes have been reserved in this manner, they can resolve which retransmissions 220 are associated with which initial transmissions 210. Of course, the problem could be extended once three initial transmissions are involved, with the same solution.

One potential ambiguity that may occur when two HARQ process IDs are reserved is that when the UA 110 receives an initial transmission 210a it does not know which HARQ process, e.g., ID 1 or ID 2, that should be assigned to the initial transmission 210a.

In one embodiment, when a semi-persistent (or configured) transmission is allocated, a message is sent to the UA 110 on the radio resource control (RRC). This RRC message contains the period of the semi-persistent (or configured) transmission. Additionally, this message may include the number of HARQ process IDs that have been reserved for semi-persistent transmissions. Alternatively, both the UA 110 and the access device 120 may already know the number of HARQ process IDs that have been reserved for semi-persistent resources. One skilled in the art will appreciate that other protocols could be used to transmit the period of the semi-persistent transmission and the number of HARQ process IDs that have been reserved for the semi-persistent transmission.

Once the UA 110 knows that a semi-persistent resource has been allocated, the UA 110 will listen for a first initial transmission. In one embodiment, the control signaling for the first initial transmission is sent on a physical downlink control channel (PDCCH). The PDCCH contains the resource blocks (RBs) and modulation and coding scheme (MCS) that will be used for the semi-persistent resource that is always in the same subframe. The UA 110 notes the system frame number (SFN) and subframe in which the RBs and MCS were transmitted on the PDCCH. The UA 110 then looks to another channel, the physical downlink shared channel (PDSCH), to obtain the semi-persistent data in the same subframe. The UA 110 uses the period information to determine when to expect the next initial transmission. For example, assume that the first initial transmission occurs at SFN=1, subframe=9 and the period is 20 subframes. The second initial transmission will occur at SFN=3 and subframe=9, assuming that there are 10 subframes per SFN. The UA 110 continues to look to the expected SFN, subframe, and RBs to decode the information in each transmission until the UA 110 receives another message telling the UA 110 to change its behavior.

As previously mentioned, one way to assign the HARQ process ID is to always assume that a given ID (e.g., ID 1) is assigned to the first transmission received.

In another embodiment, a mapping rule or index can be used to determine which HARQ process ID is assigned to the transmissions. One example is for the mapping rule to be based on the SFN, denoted herein as i, and the subframe, denoted herein as j. The number of subframes per larger frame (e.g., SFN) is denoted herein as k.

For an evolved packet system or LTE system, typical values for i are integers from 0 to 4095, typical values for j are integers from 0 to 9, and k=10. The period, denoted herein as p, maybe an integer indicating a number of subframes. For the mapping process, it is assumed that M number of HARQ process IDs are reserved to be used for the semi-persistent (or configured) transmissions.

In one embodiment, the mapping process is based upon the SFN, the subframe, the period, and the number of HARQ process IDs reserved. An example of an equation to derive the associated HARQ process is as follows (assume the reserved HARQ process is indexed from 0 to M−1):

Index for reserved HARQ Process=floor((i*k+j)/p) mod M Where floor(x) is a function that returns the highest integer less than or equal to x, and mod is an operation that finds the integer remainder of division of one number by another.

The floor(x) function can be replaced with other functions that perform in a similar manner. The floor(x) function is used to ensure that the dividend of the modulo function is an integer. For example, the ceiling function could be used instead of the floor function.

The formula above removes ambiguity between the UA 110 and the access device 120 with regard to the HARQ process ID assigned to the transmission found in that subframe.

The following is an example of finding an HARQ process through the use of the equation above in an evolved packet system or LTE system. Returning to the example given above where the first initial transmission is at SFN=1, subframe=9, the period is 20 subframes and the number of reserved HARQ process IDs is 2 (i.e., i=1, j=9, k=10, p=20, and M=2) the Index for reserved HARQ Process=floor((1*10+9)/20) mod 2=floor(19/20) mod 2=0 mod 2=0. If there are two HARQ process IDs reserved, e.g., 6 and 8, the Index for reserved HARQ Process=0 indicates that the HARQ process ID is 6. The second initial transmission is at SFN=3, subframe 9, and the period and the number of reserved HARQ process IDs are unchanged. Thus, i=3, j=9, k=10, p=20, and M=2. The Index for reserved HARQ Process=floor((3*10+9)/20)mod 2=1. and the resulting Index for reserved HARQ process=1 indicates that the HARQ process ID is 8. To finish the example, the third initial transmission is at SFN=5, subframe 9, and the period and the number of reserved HARQ process IDs, are unchanged. Thus, j=5, j=9, k=10, p=20 and M=2. The index of the reserved HARQ process=floor((5*10+9)/20)mod 2=floor(59/20)mod 2=2mod 2=0 and the HARQ process ID will be 1 again.

In another example, it is assumed that i=3, p=5, j=4, k=10 and M=2. Following the equation, index of reserved HARQ processes=floor((3*10+4)/5)mod2=floor(34/5)mod2=6 mod 2=0. For the next transmission after period p, i=3, j=9, and p and M are unchanged. Now the index of HARQ reserved processes=floor((3*10+9)/5)mod2=floor(39/5) mod 2=7 mod 2=1. For the third transmission after period p, i=4, j=3, k=10 and p and M are unchanged. Now the index of HARQ reserved processes=floor((4*10+3)/5)mod2=floor(43/5) mod 2=8 mod 2=0. Following the equation in this example, for each period the result of the floor function increases by one.

In yet another example, M may be set to 3. Following the example above, now for the first transmission the index of HARQ reserved process=6 mod 3=0. for the second transmission, the index of HARQ reserved process=7 mod 3=1. Finally, for the third transmission, the index of HARQ reserved process=8 mod 3=2. In one embodiment, the number of reserved HARQ process IDs should be at least equal to the number of periods over which the retransmissions are expected to occur.

If the ceiling function is used and i=3, j=4, k=10, p=5 and M=2, then for a first transmission the index of HARQ reserved process=ceiling((3*10+4)/5)mod2=ceiling(34/5) mod 2=7 mod 2=1. For a second transmission, the index of HARQ reserved process=ceiling((3*10+9)/5)mod 2=ceiling (39/5) mod 2=8 mod 2=0.

In another embodiment, the HARQ process ID may be determined by looking only at the SFN or subframe of the first transmission. For example, if two HARQ process IDS are reserved and if the subframe (or SFN) is even, then the HARQ process ID would be assigned to the first reserved HARQ process ID, and if the subframe (or SFN) is odd, the HARQ process ID would be assigned to the second reserved HARQ process ID. If, as suggested above, HARQ process IDs 1 and 3 are reserved, and the initial transmission is in an even subframe (or SFN) then the HARQ process ID would be 1. Alternatively, if the initial transmission is in an odd subframe (or SFN) then the HARQ process ID would be 3. This embodiment is particularly suited when the period is an odd number.

In yet another embodiment, the mapping rule may be based upon the subframe j, the period p and the number of reserved HARQ process IDs. An example, of such an equation is given by:

Index for reserved HARQ Process=floor(*j*/*p*) mod *M*

An example of this second equation is when p=20, j=4, and M=2. The index for reserved HARQ process=floor(4/20) mod 2=0. For the second transmission, the index for reserved HARQ process=floor(24/20) mod 2=1.

One skilled in the art will appreciate that any HARQ process IDs can be reserved, and that the assignment of which HARQ process ID is assigned to the outcome of the equation being 0 or 1 or an even or odd subframe (or SFN) is a matter of choice.

FIG. 2 illustrates an embodiment of a method 200 for associating initial transmissions and retransmissions. At block 261, a HARQ process ID is determined for an initial transmission based upon at least one of the system frame number, the subframe number, a period associated with the transmission and/or a reserved number of HARQ process IDs. At block 262, the determined HARQ process ID is associated with the initial transmission.

Given there are a limited number of HARQ process IDs, it is beneficial to determine the number of HARQ process IDs that should be reserved for the semi-persistent (or configured) scheduling. In one embodiment, the number of HARQ process IDs is equal to the number of periods over which the maximum number of retransmissions will occur. Therefore, if there are retransmissions outstanding for a previous initial transmission in the current period, there would be a unique HARQ process ID for each initial transmission so that the retransmission can be assigned to the proper HARQ process. Under a worst case scenario, all preceding initial transmissions will have outstanding retransmissions as shown in FIG. 3.

Figure 3:
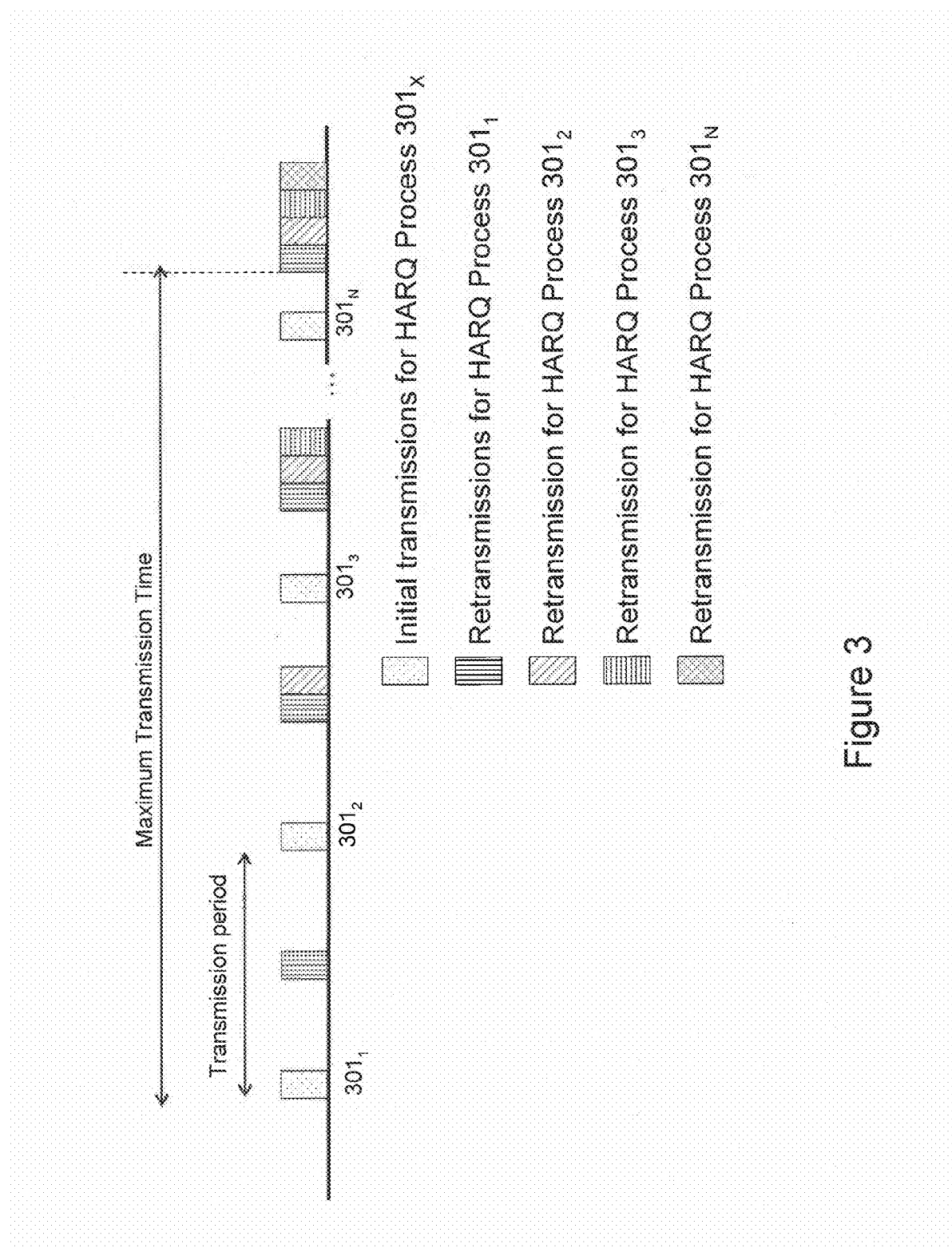
FIG. 3 illustrates a series of initial transmissions and retransmissions for some of the various embodiments of the disclosure.

FIG. 3 illustrates a series of initial transmissions 1-N on a downlink. Each initial transmission 1-N occurs after a transmission period, herein referred to as P. The maximum transmission time (MTT) is defined as the time between an initial transmission and the time of the last possible retransmission. In one embodiment, the following equation can be used to determine the minimum number of HARQ process IDs that should be reserved:

$$M = \text{ceiling}(MTT/P)$$

Figure 4:
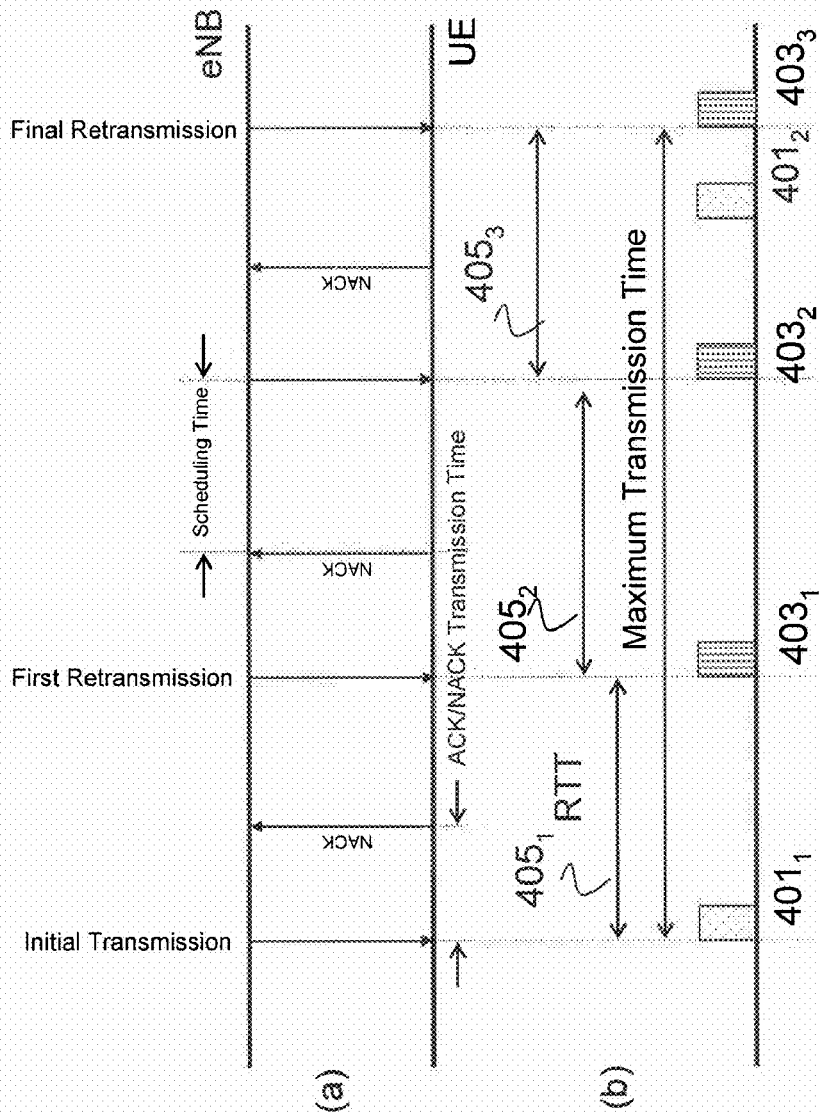
FIG. 4 illustrates an initial transmissions and retransmission timing for some of the various embodiments of the disclosure.

In one embodiment, in order to determine MTT, a bit more information is needed about the system. FIG. 4 illustrates a series of initial semi-persistent transmissions $401_N$ (such as VoIP) and retransmissions $403_N$ from the network access device to the UA. An initial transmission $401_1$ is sent from the network access device to the UA. The UA then attempts to decode the packet and prepare to respond with an ACK (if the packet is successfully decoded) or a NACK (if the packet is not successfully decoded) on the uplink. The time it takes the UA to receive the packet, attempt to decode the packet and transmit the ACK or NACK can be referred to as the ACK/NACK Transmission Time (ATT). In one embodiment, the actual decoding time of a downlink packet is approximately 1 millisecond (ms). In one embodiment, the ATT is a fixed duration of time, e.g., 4 ms. A timer at either the access device or UA may be used to track the ATT. For example, when the ATT is fixed, the access device can schedule the uplink transmission of the ACK/NACK implicitly (e.g., without additional signaling). Thus, the access device knows when to expect the ACK or NACK from the UA.

In the case of retransmissions, once the access device receives the NACK from the UA, the access device knows to retransmit the packet. One skilled in the art will appreciate that the retransmission may not be an exact duplicate of the initial transmission, but may instead be additional data that the UA may use to help in decoding the initial transmission. The time between the initial transmission and the retransmission can be referred to as the round trip time (RTT). The RTT may also incorporate the time that the access device needs to schedule the retransmission, which may be referred to as the scheduling time (ST). In one embodiment, the ST may be a fixed duration. When the ST is a fixed duration, then the RTT is also fixed. However, in highly loaded conditions, the ST time may need to vary to allow the access device flexibility in scheduling downlink transmissions. Thus, the ST and RTT may be variable.

In one embodiment, the RTT is variable and the MTT can be formulated as a series of ATTs added to the ST as shown in the following equation:

$$MTT_v = \sum_{i=1}^{I}(ATT_i + ST_i)$$

Where v indicates that MTT is variable over time, and I is the maximum number of retransmissions allowed. In one embodiment, such as an LTE system, the maximum number of retransmissions, I, for a semi-persistent scheduled (or configured) service is determined by the network access device (e.g., eNB); thus the network access device can configure the minimum number of HARQ process IDs, M, and signal the corresponding HARQ reservation information to the UA by the high layer signaling such as RRC signaling.

The equation for $MTT_v$ can be simplified into the following equation:

$$MTT_v = \sum_{i=1}^{I} RTT_i$$

In one embodiment, if ATT and ST and thus RTT are fixed, then the equation for MTT becomes:

$$MTT_f = I \cdot RTT$$

Where f indicates fixed and that MTT does not vary over time. Since it is likely that many systems will need the flexibility of a varying ST and thus RTT, a maximum possible RTT (MRTT) can be used to simplify the equations without losing the flexibility of ST. MRTT can be defined by the following equation:

$$MRTT = \max_{\forall t \in T}\{ATT_t + ST_t\}$$

Where t represents each initial semi-persistent (or configured) transmission on the downlink. By allowing ST and thus ATT to vary, but placing a maximum value on ST and ATT the equation for $MTT_f$ becomes:

$$MTT_f = I \cdot MRTT$$

Where $MTT_f \geq MTT_v$

Either $MTT_f$ or $MTT_v$ can be substituted into the equation for M=ceiling(MTT/P) discussed above.

As an example, return to FIG. 4, where it is assumed that I=3, RTT $405_1$=8 ms, RTT $405_2$=8 ms, RTT $405_3$=7 ms, and P=20 ms. Thus M=ceiling[(8+8+7)/20]=2.

Figure 5:
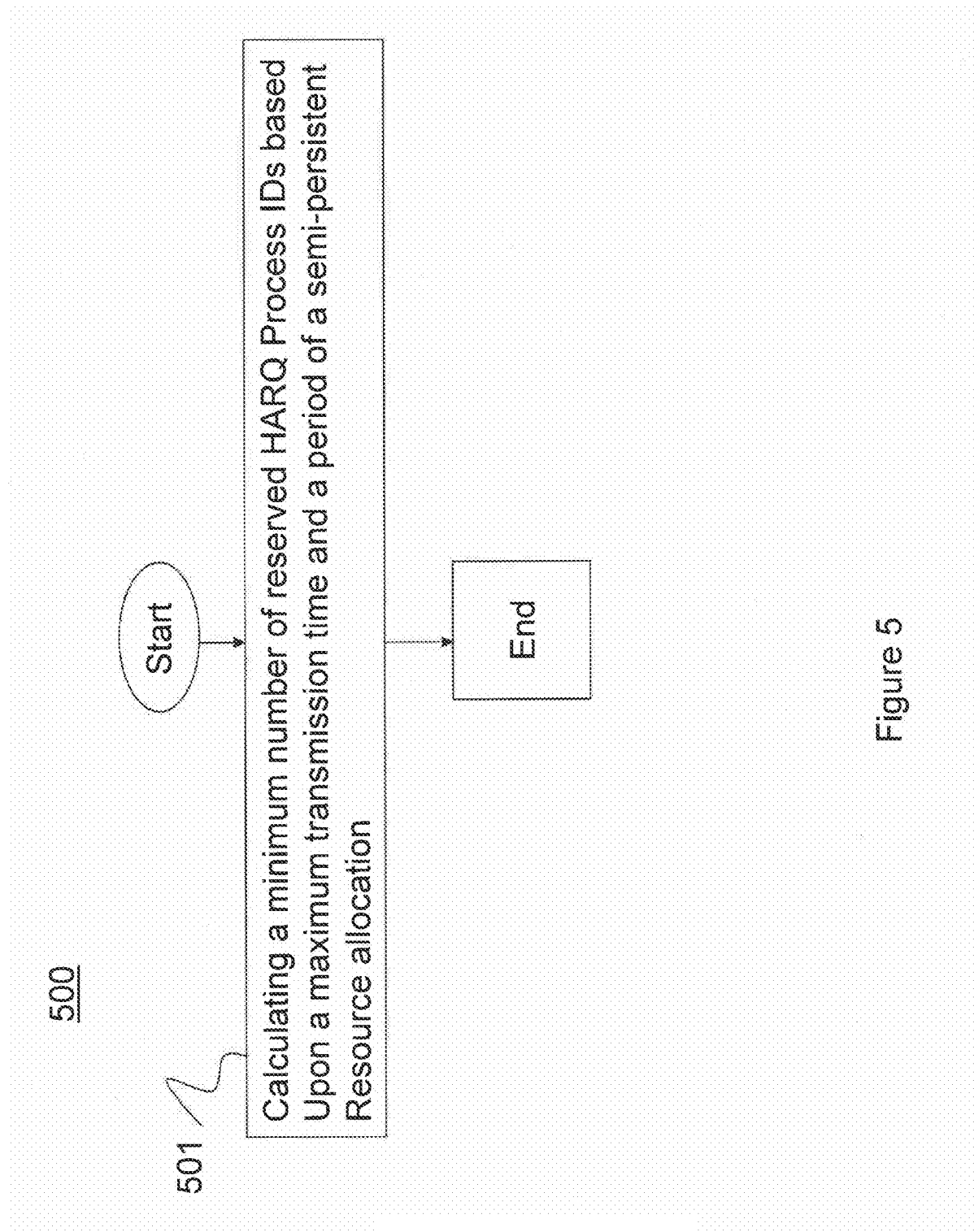
FIG. 5 is a diagram of a method according to an embodiment of the disclosure

FIG. 5 illustrates a method in, accordance with one embodiment of the present disclosure. Method 500 includes box 501 where a minimum number of reserved HARQ Process IDs is calculated based upon a maximum transmission time and a period of a semi-persistent resource allocation.

As mentioned above, there are generally a limited number of HARQ Process IDs available. For example, in one embodiment of an LTE system, the number of HARQ Process IDs is equal to 8. The network access device has knowledge of how many HARQ Process IDs are allowed and maintains control over which HARQ Process IDs have been allocated or are currently in use. For example, suppose that there are eight HARQ Process IDs belonging to the pool of available HARQ Process IDs. If there is a dynamically allocated transmission, then the network access device will assign one of the HARQ Process IDs from the pool of available IDs to the transmission. The network access device knows that that HARQ Process ID has been assigned, and will not attempt to reuse that HARQ Process ID until the network access device receives an ACK from the user agent with respect to the transmission, or the maximum number of retransmissions has been met. Once an ACK is received or the maximum number of retransmissions has been met, the assigned HARQ Process ID will be returned to the pool of available HARQ Process IDs.

When the network access device is aware that a semi-persistent transmission has been scheduled, the network access device will then calculate the maximum number of reserved HARQ Process IDs needed according to the description above. Once the network access device determines the minimum number of reserved HARQ process IDs needed, it will then select HARQ Process IDs from the available pool of HARQ Process IDs, such that the number of selected HARQ Process IDs for semi-persistent scheduled services is equal to the minimum number of reserved HARQ Process IDs needed. The network access device may select the HARQ Process IDs according to any algorithm, such as a random selection, or selecting the next available HARQ Process IDs in sequence. The network access device then transmits the selected HARQ Process IDs to the user agent.

Figure 6:
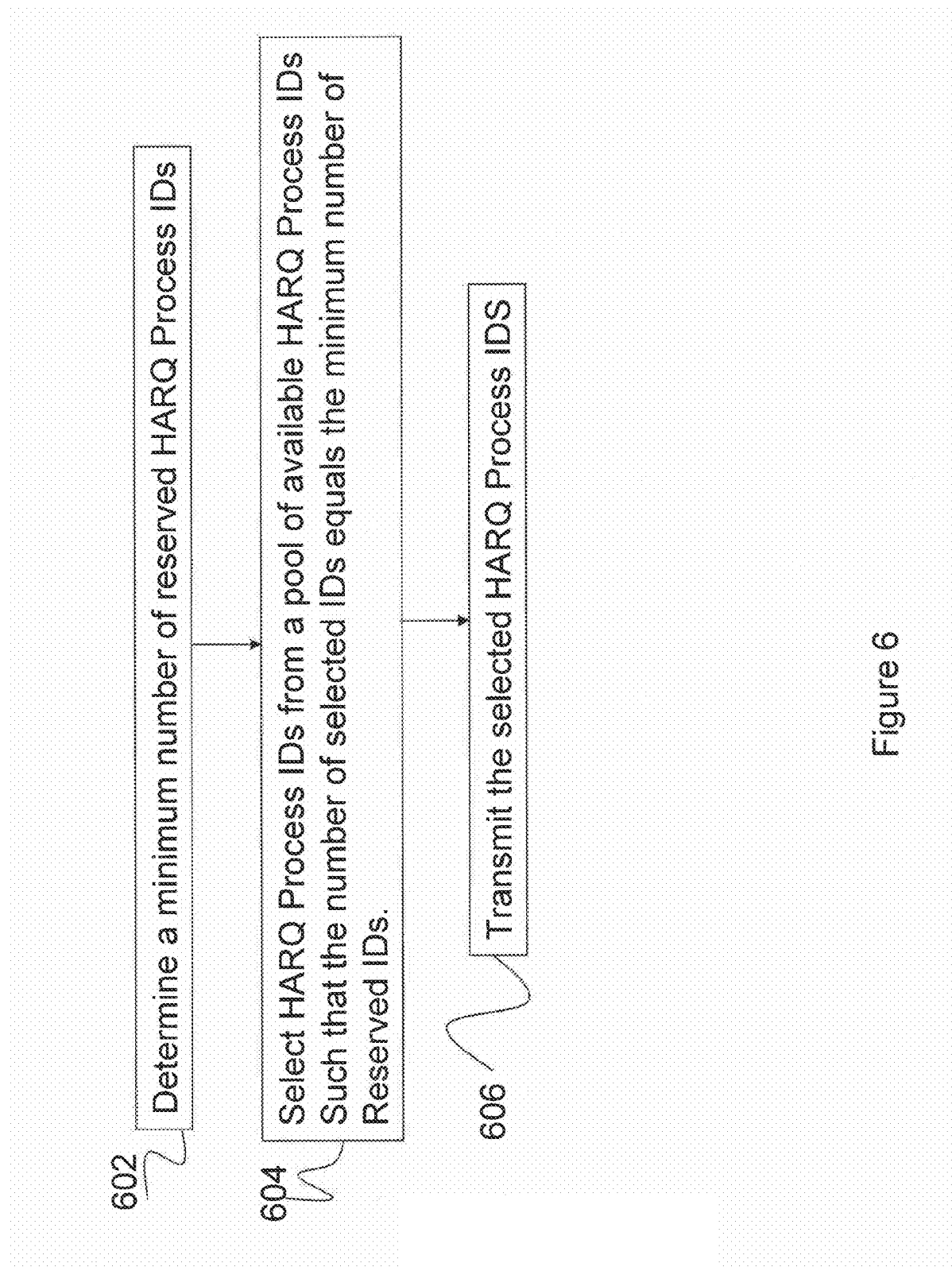
FIG. 6 is a diagram of a method according to an embodiment of the disclosure.

FIG. 6 illustrates an additional method in accordance with one embodiment of the present invention. At block 602, the network access device determines a minimum number of reserved HARQ Process IDs. At block 604, the network access device then selects HARQ Process IDs from a pool of available HARQ Process IDs such that the number of selected IDs equals the minimum number of reserved HARQ Process IDs. Then at block 606, the network access device transmits the selected HARQ Process IDs to the user agent.

Figure 7:
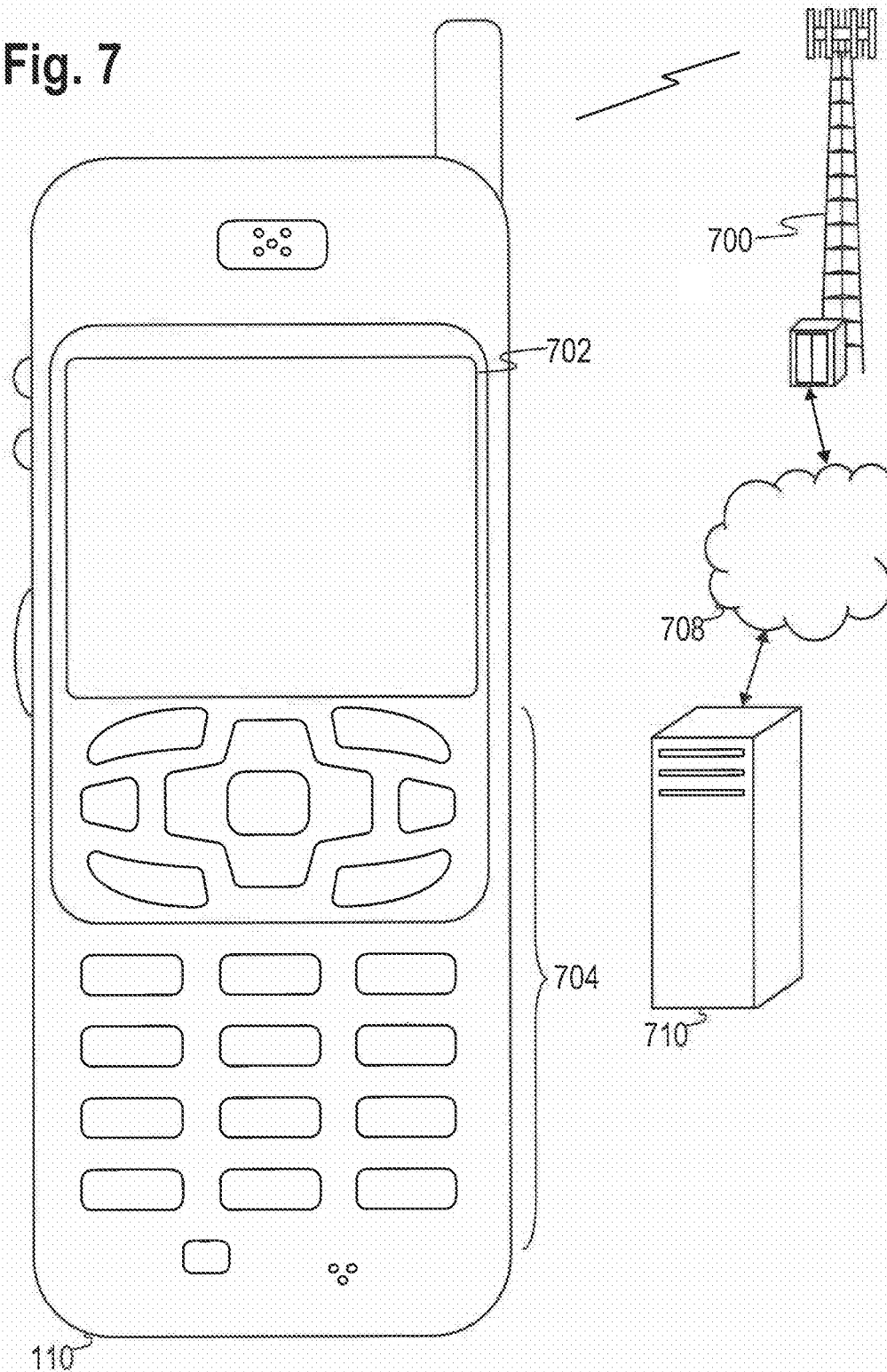
FIG. 7 is a diagram of a wireless communications system including a user agent operable for some of the various embodiments of the disclosure.

FIG. 7 illustrates a wireless communications system including an embodiment of the UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, a wireless handset, a pager, a PDA, or a telecommunications device installed in a vehicle. The UA 110 may also be a device, include a device, or be included in a device that has similar capabilities but that is not transportable, such as a desktop computer, a set-top box, or a network node. The UA 110 may support specialized activities such as gaming, inventory control, job control, and/or task management functions, and so on.

The UA 110 includes a display 702. The UA 110 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct.

The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 702 to show a web page. The web page may be obtained via wireless communications with a wireless network access node, a cell tower, a peer UA 110, or any other wireless communication network or system 700. The network 700 is coupled to a wired network 708, such as the Internet. Via the wireless link and the wired network, the, UA 110 has access to information on various servers, such as a server 710. The server 710 may provide content that may be shown on the display 702. Alternately, the UA 110 may access the network 700 through a peer UA 110 acting as an intermediary, in a relay type or hop type of connection.

Figure 8:
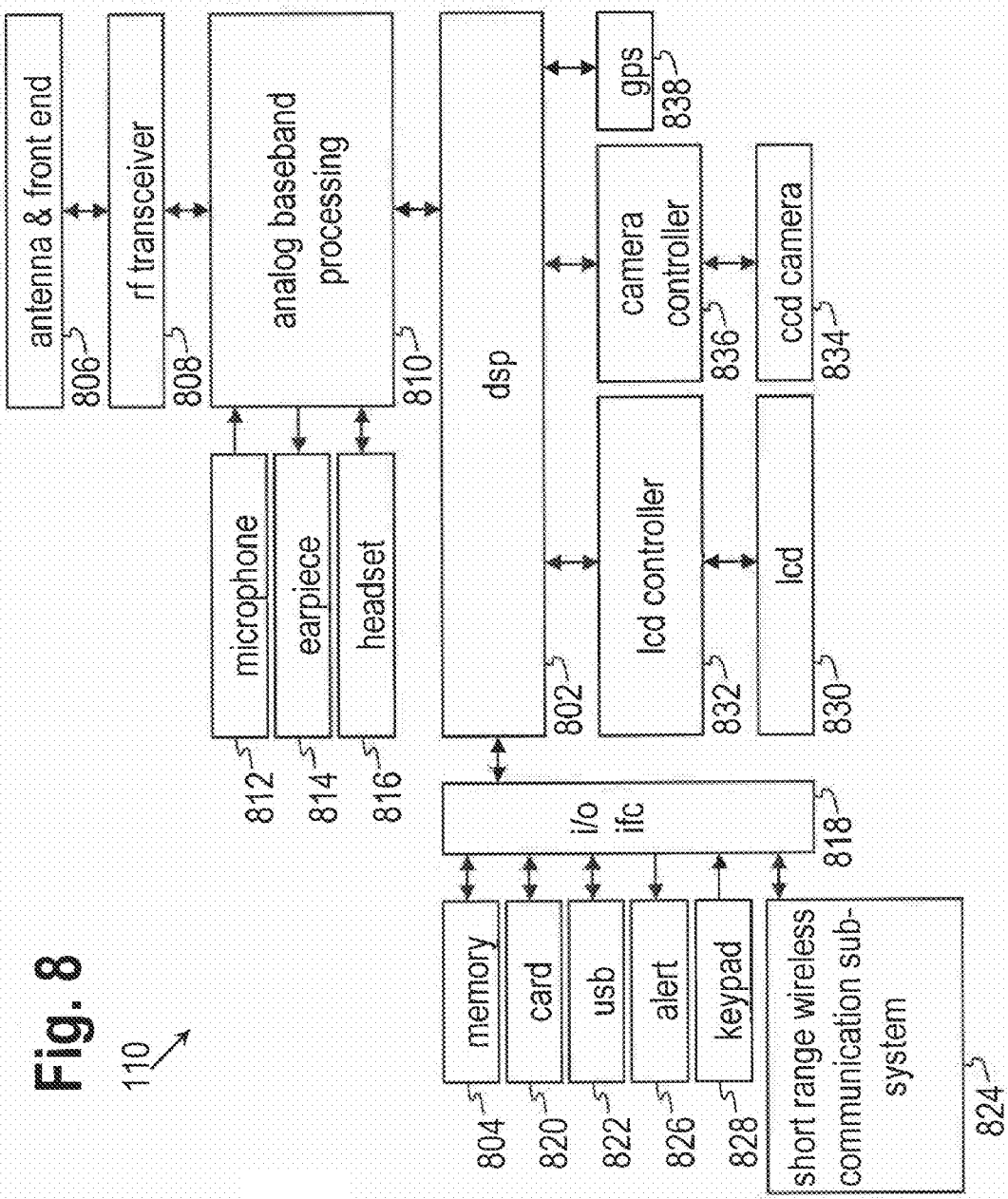
FIG. 8 is a block diagram of a user agent operable for some of the various embodiments of the disclosure.

FIG. 8 shows a block diagram of the UA 110. While a variety of known components of UAs 110 are depicted, in an embodiment a subset of the listed components and/or additional components not listed may be included in the UA 110. The UA 110 includes a digital signal processor (DSP) 802 and a memory 804. As shown, the UA 110 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 110 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 110 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 110 to send and receive information from a cellular network or some other available wireless communications network or from a peer UA 110. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 110 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 110 and may also enable the UA 110 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 110 to communicate wirelessly with other nearby mobile devices and/or wireless base stations.

The input/output interface 818 may further connect the DSP 802 to the alert 826 that, when triggered, causes the UA 110 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 110. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 110 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 110 to determine its position. Various other peripherals may also be included to provide additional functions, e.g., radio and television reception.

Figure 9:
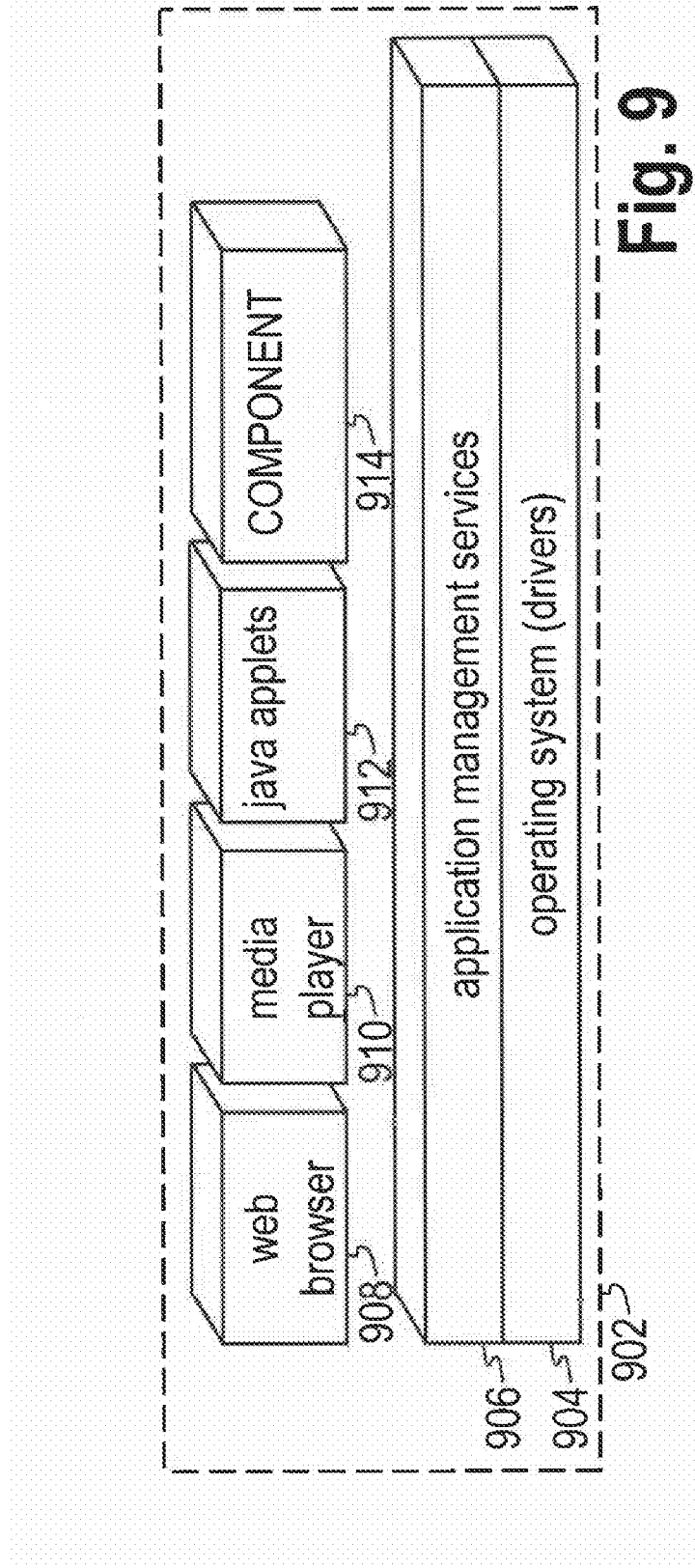
FIG. 9 is a diagram of a software environment that may be implemented on a user agent operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 110. Also shown in FIG. 9 are a web browser application 908, a media player application 910, and Java applets 912. The web browser application 908 configures the UA 110 to operate as a web browser, allowing a user to enter information into forms and select links to retrieve and view web pages. The media player application 910 configures the UA 110 to retrieve and play audio or audiovisual media. The Java applets 912 configure the UA 110 to provide games, utilities, and other functionality. A component 914 might provide functionality described herein.

Figure 10:
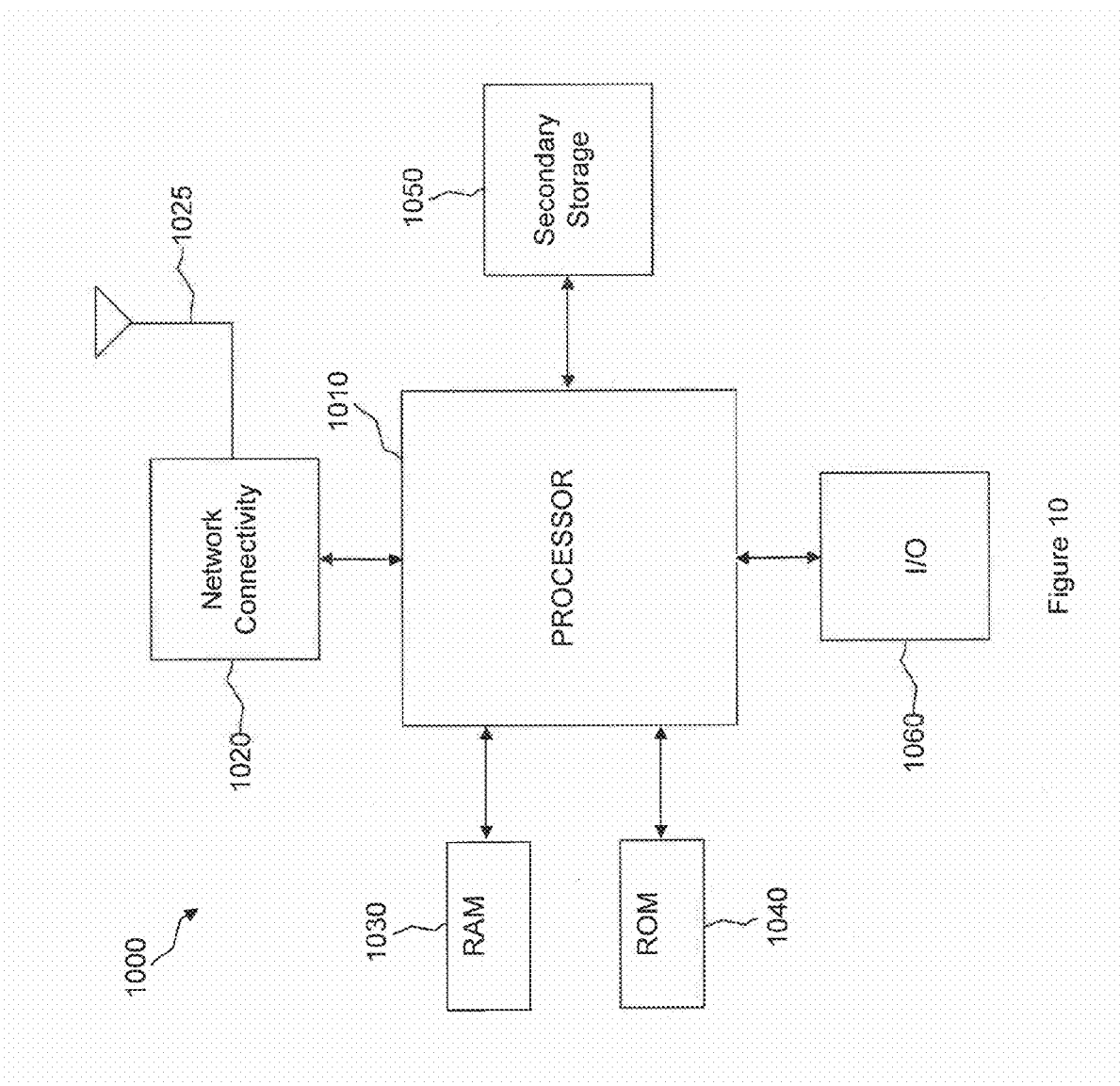
FIG. 10 is an illustrative general purpose computer system suitable for some of the various embodiments of the disclosure.

The UA 110, access device 120, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by, the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 110, such as the display 702 and the input 704.

The following is an alternative embodiment of the disclosure.

There is an issue with HARQ process ID ambiguity when a DL SPS retransmission occurs, the UE needs to associate the possible retransmission (with HARQ Process ID via PDCCH signaling) with the initial transmission that is sitting in one of the HARQ buffers. Retransmissions are "dynamically" scheduled. That is, the UE monitors the PDCCH to get the payload that contains information on how to find and decode information intended for it. The payload contains information including the system frame number (SFN; frames lasting 10 ms), and the subframe (lasting 1 ms within the frame) to find the given resource blocks (RBs) to decode. This payload will also contain the HARQ process ID.

SPS transmissions are not assigned in a PDCCH payload and, hence, have no associated HARQ process ID. Hence it is difficult to link the transmission and the retransmission(s) HARQ processes that perform the soft combining. An additional problem is shown in the middle of FIG. 1, and occurs when a retransmission is sent after the next SPS transmission. The UE has no way of way of knowing which transmission (the earlier or later) that the retransmission should be combined with.

A simple general way to resolve these issues is to reserve HARQ Processes that are implicitly assigned to the DL SPS Transmissions. In the following, we will further analyze the details.

I. HARQ Process Reservation

The need to link the transmission with its retransmission happens on 10-15% of transmitted voice packets. A simple and robust way to assign a HARQ processes ID to each transmission and subsequent HARQ retransmissions is to reserve one that can't be used by dynamically scheduled transmission when an SPS is configured. For example, reserve HARQ process 1 (or other HARQ process) for SPS transmissions; and no dynamically scheduled transmissions would be allowed to use HARQ process 1 when it is in use by an SPS application. When SPS is configured, the UE would automatically use process 1 for all transmissions and retransmissions.

Figure 11:
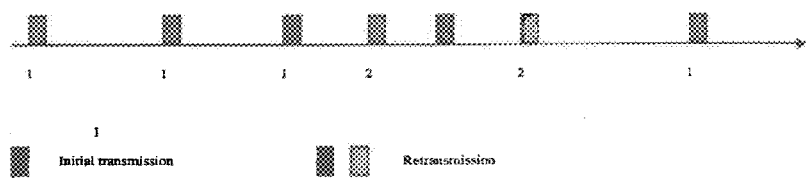
FIG. 11 is a diagram of HARQ process cycling.

If two HARQ processes are reserved and mapped to the SFN and/or subframe, then the problem of having an outstanding retransmission occurs after the subsequent SPS transmission (see the middle of FIG. 1) is also resolved. An example of this would be that HARQ process 1 and HARQ process 2 are used cyclically every 20 ms (so the HARQ usage pattern is 1, 2, 1, 2, 1, 2 . . .). Although having two HARQ processes set aside resolves the issues above, when a UE receives a transmission it does not know the HARQ process ID (e.g. ID 1 or 2) that is assigned to it (see FIG. 11). The assignment should happen when the SPS transmission is allocated.

When an SPS transmission is allocated, a message is sent to the UE that contains the SFN, subframe, period and RBs to define the resource. Having obtained this information the UE simply goes to that SFN, subframe and RBs to decode its information. It uses the period information to know when to expect its next transmission. The UE will continue to do this until another message is sent to it telling it to change its behavior.

One straightforward way to assign the HARQ process ID is to always assume ID 1 (or 2) on the first transmission received. However, a more general mapping rule can be designed based on the SFN i together and the subframe j, in one radio frame. The value i is an integer from 0 to 4095 and j is an integer from 0 to 9. Assume the SPS period is p (an integer) in subframes, and assume we have reserved M HARQ processes for the SPS. We propose to use the following formula for the HARQ process ID:

$$ID(i, j, p, M) = \text{floor}((i*10+j)/p) \bmod M.$$

This ensures that there is no ambiguity between the eNB and the UE with regard to the HARQ process assigned to the transmission found in that subframe. As an example, choose M=2, SFN=100, subframe=2 and period=20. This means ID(2,100,20,2)=(floor(2*10+100)/20)mod2=0. If there are two processes reserved, say HARQ process 1 and 3. The 0 would indicate that the HARQ process ID is 1 and ID=1 would indicate HARQ process 3. For the next example, choose M=2, SFN=100, subframe=3 and period=20. Then ID(3,100,20,2)=1. This would be assigned to HARQ process 3.

Another way to assign the process ID is to let the evenness or oddness of the SFN or subframe of the first transmission determine the ID. If for example the subframe is even, the ID would be 2; if it is odd, the ID would be 1. Note that these cases are covered by this general formula.

II. Formulation of M

The number of HARQ process IDs needs to be at least equal to the number of periods over which the maximum retransmissions will transpire. The simple explanation is that with each new period a new initial transmission is sent. If there are retransmissions outstanding for a previous initial transmission in the current period, there needs to be a unique HARQ process ID for each initial transmission so that retransmission can be assigned to the proper HARQ process. In choosing M, we must acknowledge the worst case scenario that there will be (a low probability of) instances where all preceding initial transmissions have outstanding retransmissions. FIG. 3 provides an illustration. The figure shows a series of transmissions on the downlink. At the far left is the first initial transmission and at the far right is the Nth initial transmission. Each initial transmission occurs after a transmission period P. It is easy to see that when retransmissions from all initial transmissions are still outstanding that there will need to be N HARQ process IDs. Further, if we know the maximum transmission time (MTT) between an initial transmission and the time that it takes to complete all possible retransmissions, the following equation calculates the minimum number of HARQ process IDs:

$$M = \text{Ceil}(MTT/P) \quad \text{Equation 1}$$

Using FIG. 3 we can easily see that M=N. To make Equation 1 more useful, we need to be able to calculate MTT.

FIG. 4a shows the flow diagram of a series of initial voice transmissions and retransmissions from the eNB to the UE. It shows the receipt of initial transmission (green) and retransmissions (red). At the very left part of FIG. 4a the first initial transmission is sent. In physical terms a voice packet is transmitted over the air to the UE. There is a small amount of time that the UE will take to attempt to decode the packet and prepare to respond with an ACK (if it successfully decodes) or NACK (if it doesn't) on the uplink. We will call this the ACK/NACK Transmission Time (ATT). In modern wireless communication systems, the actual decoding time of the DL packet takes around 1 ms, perhaps a little more. Sometimes the ATT is fixed (this can be done with a timer) with an example being 4 ms. When it is fixed, it is done so that the eNB can schedule the uplink transmission implicitly (without additional signalling) and it can be ready for the UE ACK/NACK transmission.

Once the (in this case) eNB receives a NACK, it knows to retransmit the voice packet or at least a packet of data that the UE can use to help in decoding the initial transmission. The time between the initial transmission and retransmission is called the round trip time (RTT). The RTT incorporate the Scheduling Time (ST). As with the ATT, the ST can be fixed. With that it is possible to have a fixed RTT. However, again like the ATT, the eNB needs flexibility in scheduling downlink voice packets, especially during heavily loaded conditions. In general, ST will not be fixed or constant and, hence, the RTT will not be fixed or constant.

As the RTT will likely be variable and the MTT can be formulated as a series of ATTs added to Scheduling Time (ST)

$$MTT_v = \sum_{i=1}^{I} (ATT_i + ST_i) \quad \text{Equation 2}$$

with the v subscript on MU implying that the value is variable over time and where I is the maximum number of retransmissions (In a practical cellular system, such as LTE, the maximum number of retransmissions, I, for the SPS service is determined by the eNB, and therefore the eNB can configure the minimum needed HARQ process M and signal the corresponding HARQ reservation information to the UE by the high layer signaling such as RRC signaling) possible. Equation 2 can be simplified to be $$MTT_v = \sum_{i=1}^{I} RTT_i. \quad \text{Equation 3}$$

If ATT and ST are fixed, so is RTT and Equation 3 can be reduced to $$MTT_f = I \cdot RTT \quad \text{Equation 4}$$

with the f subscript on MTT implying a fixed value. As we have seen, Equations 2 and 3 will vary in time. Often we will want to work with a fixed MU. This can be done by using Equation 4 and fixing ST and ATT. There is an alternative. WE can define the maximum possible RTT (MRTT) as $$MRTT = \max_{\forall t \in T}\{ATT_t + ST_t\} \quad \text{Equation 5}$$

were t represents each initial transmission in the downlink voice communication. This may be known by setting certain system settings and allowing ATT and ST to vary, but place a maximum on them. This allows another definition of the fixed MTT to be $$MTT_f = I \cdot MRTT \quad \text{Equation 6}$$

with $$MTT_f \geq MTT_v \quad \text{Equation 7}$$

Equation 7 points out that the MTT of Equation 6 will always be equal to or larger than the MTT in Equation 2 or 3. Note that any of the fixed or variable MTTs in the equations above can be substituted into Equation 1 and used to calculate M.

As an example and completing the discussion on FIG. 4, it is seen that the second retransmission arrives after the second initial transmission and a third retransmission arrives after the second initial retransmission. In this example the maximum number of retransmissions I is three. The first RTT=8 ms, the second RTT=8 ms and the third RTT=7 ms. The period P is 20 ms then, MTT=8+8+7=23 ms, and the M is easily calculated Ceil(23/20)=2.

The following 3rd Generation Partnership Project (3GPP) Technical Specifications (TS) are incorporated herein by reference: TS 36.321, TS 36.331, and TS 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
    a processor configured to;
    reserve a number of HARQ process IDs based upon a maximum transmission time and a period of a semi-persistent resource allocation; and
    select HARQ process IDs from an available pool of HARQ process IDs, such that the number of selected HARQ process IDs for semi-persistent scheduled services is equal to a minimum number of reserved HARQ process IDs,
    wherein the number of reserved HARQ process IDs is proportional to the maximum transmission time and is inverse proportional to the period of semi-persistent resource allocation, and
    wherein the number of reserved HARQ process IDs is calculated by M=ceiling (MTT/P), where M is the number of reserved HARQ process IDs, MTT is the maximum transmission time and P is the period of a semi-persistent resource allocation.

2. The system of claim 1, wherein the system is an access device.

3. The system of claim 1, wherein the system is an enhanced node B.

4. The system of claim 1, wherein the processor is further configured to transmit the number of the selected HARQ process IDs to a user agent.

5. The system of claim 4, wherein the user agent is a user equipment.

6. A method comprising:
    reserving, with a processor, a number of HARQ process IDs based upon a maximum transmission time and a period of a semi-persistent resource allocation; and
    selecting HARQ process IDs from an available pool of HARQ process IDs, such that the number of selected HARQ process IDs for semi-persistent scheduled services is equal to a minimum number of reserved HARQ process IDs,
    wherein the number of reserved HARQ process IDs is proportional to the maximum transmission time and is inverse proportional to the period of semi-persistent resource allocation, and
    wherein the number of reserved HARQ process IDs is calculated by M=ceiling (MTT/P), where M is the number of reserved HARQ process IDs, MTT is the maximum transmission time and P is the period of a semi-persistent resource allocation.

7. The method of claim 6, further comprising transmitting the number of selected HARQ process IDs to a user agent.

8. The method of claim 7, wherein the user agent is a user equipment.

9. The method of claim 8, wherein the number of selected HARQ process IDs is transmitted to the user equipment from an access device.

10. The method of claim 8, wherein the number of selected HARQ process IDs is transmitted to the user equipment from an enhanced node B.

* * * * *